Figure 1:
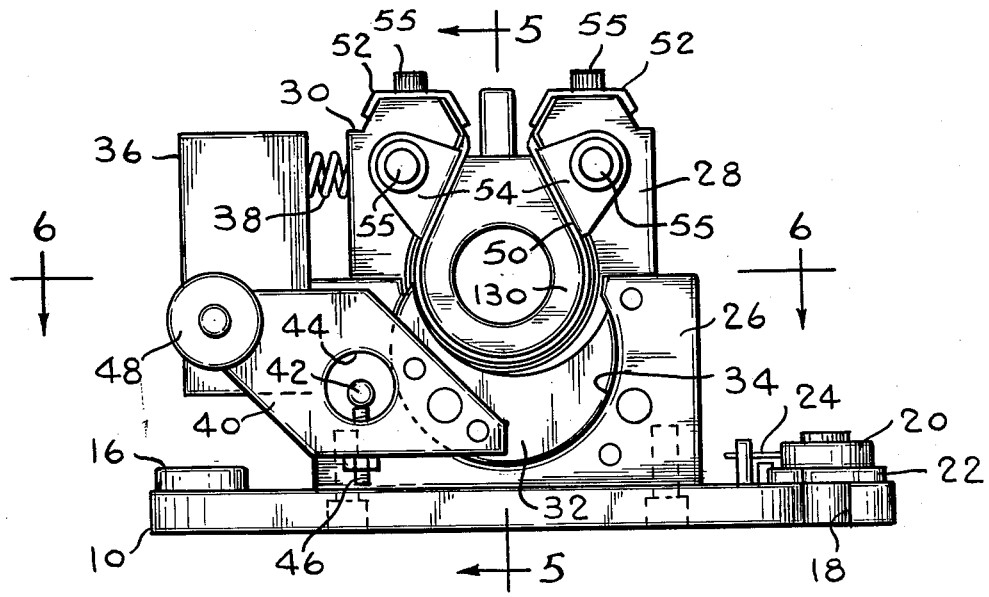

April 9, 1963    K. A. ANDERSON    3,084,390
MOLDING APPARATUS FOR ENCAPSULATING A COIL
Filed Sept. 17, 1959    15 Sheets-Sheet 1

INVENTOR.
KARL A. ANDERSON
BY
ATTORNEY

April 9, 1963 K. A. ANDERSON 3,084,390
MOLDING APPARATUS FOR ENCAPSULATING A COIL
Filed Sept. 17, 1959 15 Sheets-Sheet 2

INVENTOR.
KARL A. ANDERSON
BY
ATTORNEY

April 9, 1963  K. A. ANDERSON  3,084,390
MOLDING APPARATUS FOR ENCAPSULATING A COIL
Filed Sept. 17, 1959  15 Sheets-Sheet 3

INVENTOR.
KARL A. ANDERSON
BY
ATTORNEY

April 9, 1963   K. A. ANDERSON   3,084,390
MOLDING APPARATUS FOR ENCAPSULATING A COIL
Filed Sept. 17, 1959   15 Sheets-Sheet 4
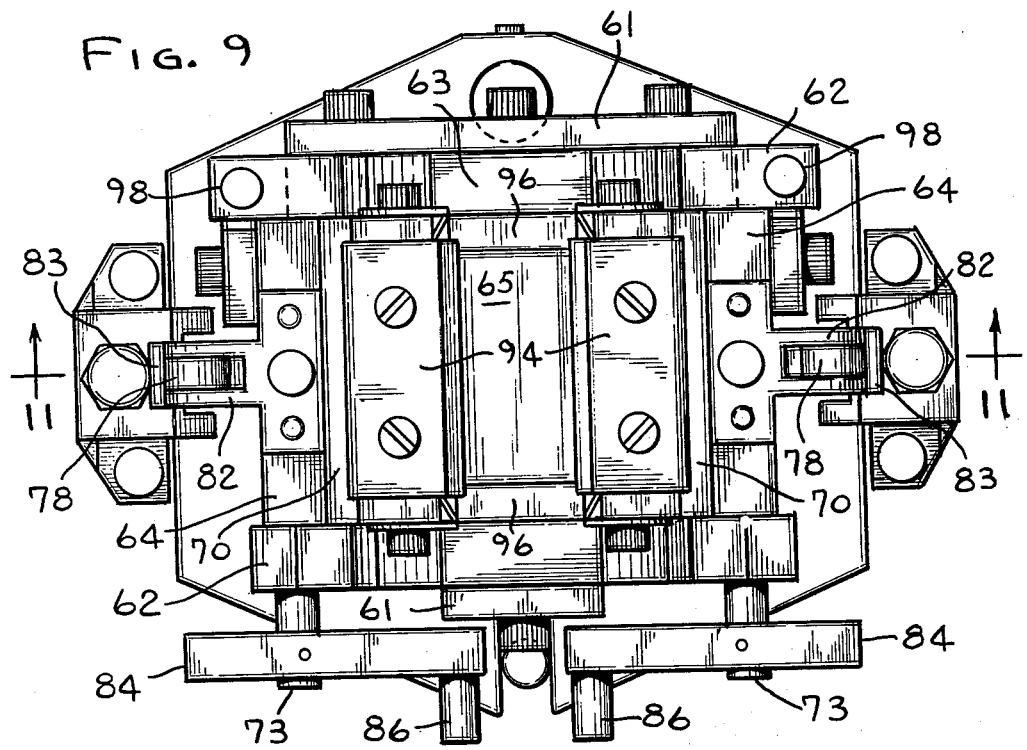
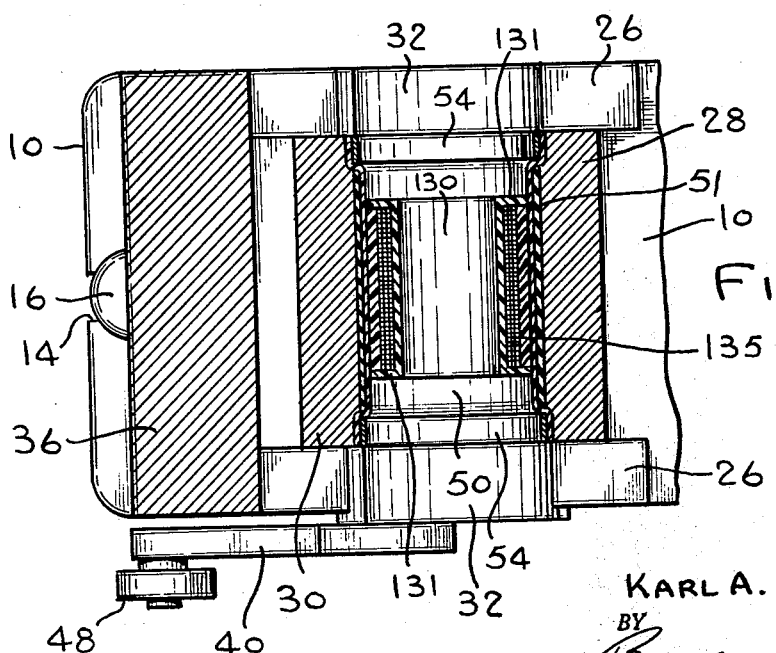
INVENTOR.
KARL A. ANDERSON
BY
ATTORNEY April 9, 1963 K. A. ANDERSON 3,084,390
MOLDING APPARATUS FOR ENCAPSULATING A COIL
Filed Sept. 17, 1959 15 Sheets-Sheet 5
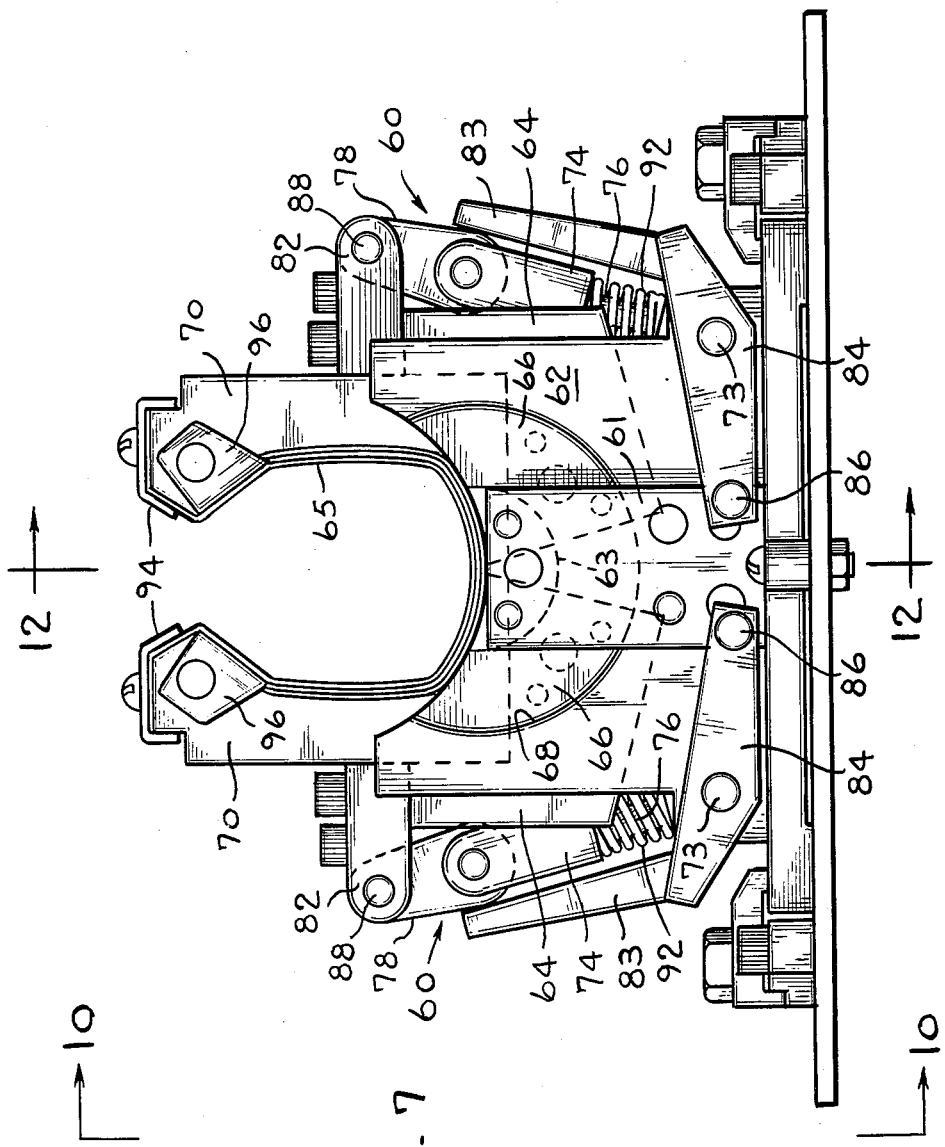
INVENTOR.
KARL A. ANDERSON
BY
ATTORNEY April 9, 1963  K. A. ANDERSON  3,084,390
MOLDING APPARATUS FOR ENCAPSULATING A COIL
Filed Sept. 17, 1959  15 Sheets-Sheet 6

INVENTOR.
KARL A. ANDERSON
BY
ATTORNEY

April 9, 1963 K. A. ANDERSON 3,084,390
MOLDING APPARATUS FOR ENCAPSULATING A COIL
Filed Sept. 17, 1959 15 Sheets-Sheet 7

INVENTOR.
KARL A. ANDERSON
BY
ATTORNEY

April 9, 1963  K. A. ANDERSON  3,084,390
MOLDING APPARATUS FOR ENCAPSULATING A COIL
Filed Sept. 17, 1959  15 Sheets-Sheet 8

INVENTOR.
KARL A. ANDERSON
BY
ATTORNEY

April 9, 1963

K. A. ANDERSON 3,084,390

MOLDING APPARATUS FOR ENCAPSULATING A COIL

Filed Sept. 17, 1959

15 Sheets-Sheet 10

INVENTOR.
KARL A. ANDERSON
BY
ATTORNEY

April 9, 1963 K. A. ANDERSON 3,084,390
MOLDING APPARATUS FOR ENCAPSULATING A COIL
Filed Sept. 17, 1959 15 Sheets-Sheet 11

INVENTOR.
KARL A. ANDERSON
BY
ATTORNEY

April 9, 1963 K. A. ANDERSON 3,084,390
MOLDING APPARATUS FOR ENCAPSULATING A COIL
Filed Sept. 17, 1959 15 Sheets-Sheet 12

INVENTOR.
KARL A. ANDERSON
BY
ATTORNEY

April 9, 1963 K. A. ANDERSON 3,084,390
MOLDING APPARATUS FOR ENCAPSULATING A COIL
Filed Sept. 17, 1959 15 Sheets-Sheet 13

INVENTOR.
KARL A. ANDERSON
BY
ATTORNEY

April 9, 1963  K. A. ANDERSON  3,084,390
MOLDING APPARATUS FOR ENCAPSULATING A COIL
Filed Sept. 17, 1959  15 Sheets-Sheet 14
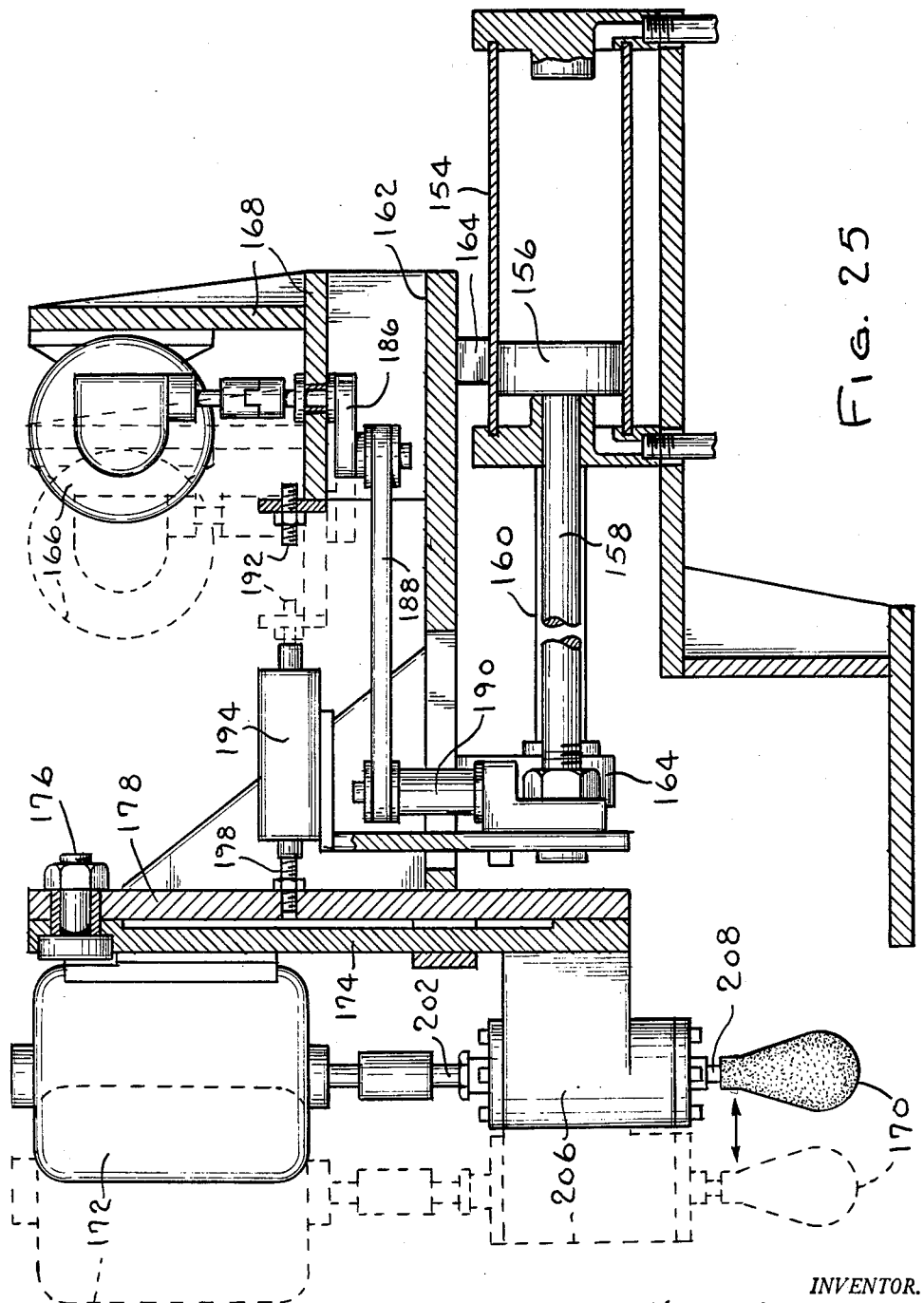
INVENTOR.
KARL A. ANDERSON
BY
ATTORNEY

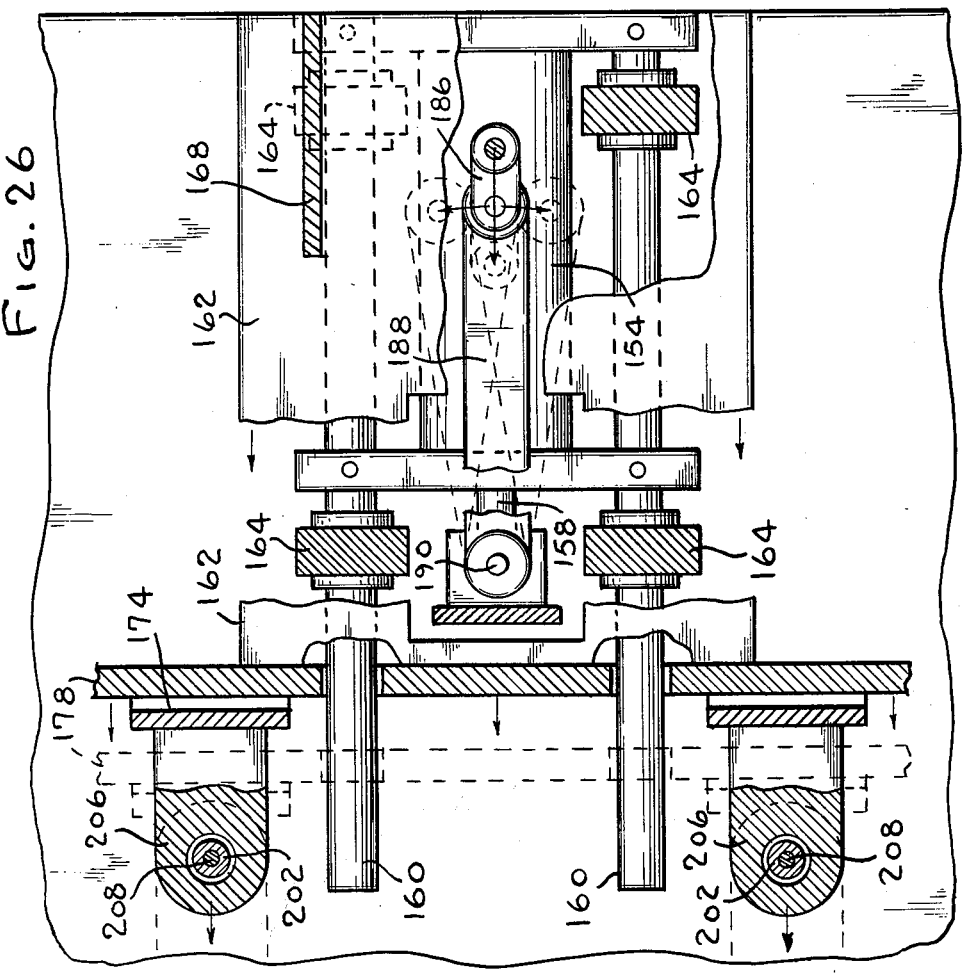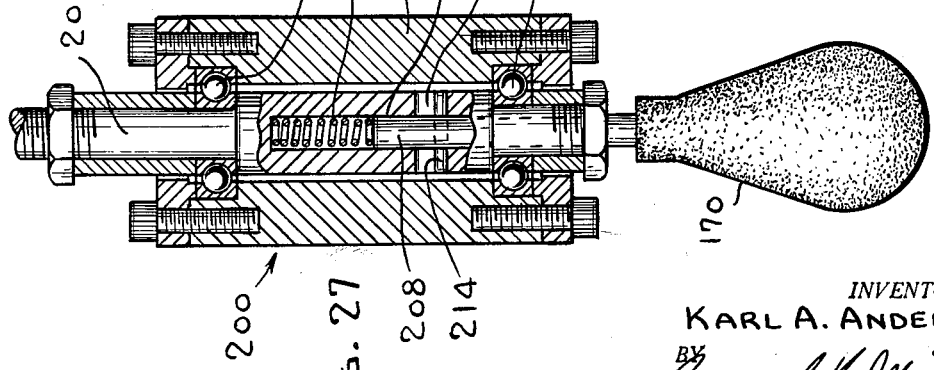

United States Patent Office 3,084,390
Patented Apr. 9, 1963

3,084,390
MOLDING APPARATUS FOR ENCAPSULATING
A COIL
Karl Allan Anderson, Park Ridge, Ill., assignor to Controls Company of America, Schiller Park, Ill., a corporation of Delaware
Filed Sept. 17, 1959, Ser. No. 840,653
4 Claims. (Cl. 18—36)

This invention relates to flexible molds and apparatus for mass production of encapsulated electrical coils.

Encapsulation of electrical coils on a mass production scale has presented several difficult problems due to the abrasive and adhesive character of the encapsulating compounds. Current producers use die cast, machined molds which are costly and have a relatively short life. These molds are preheated and sprayed with a release agent before a coil is placed therein. The resin compound is prepared in batches and poured on the coil in the mold. After curing, the coils are removed from the form and the mold re-surfaced for the next use. Such a foundry type operation requires a great number of molds.

In the present invention an assembly line type of operation is contemplated rather than the foundry type mentioned above. A conveyor is provided on which a plurality of molds is positioned and is advanced in a step by step manner. The molds are opened or held open during one step and a coil of the type set forth in copending application Serial No. 857,660, filed December 7, 1959, is placed in the mold. The mold includes a moveable jaw which is closed on the coil in the next step of movement so that a flexible liner positioned within the jaws seals on the ends of the coil to form a cavity mold in cooperation with the coil bobbin. The resin which is used as the encapsulant is continuously mixed with a hardener immediately prior to using and is poured in the cavity formed by the mold and the ends of the coil. When the resin and hardener have set the coil is removed by opening the mold. The equipment allows a great variation of proportions of resins and hardeners to be used which will permit use of the most economical curing time, thereby reducing the number of molds required for the conveyor.

Teflon (tetrafluoroethylene) was selected for the liner because it is flexible, wear resistant and has non-wetting characteristics which reduce the possibility of the resin adhering thereto. There is a tendency for the resin to mechanically adhere to imperfections present in the surface of the liner. These imperfections are due to the skiving operation used to produce the liners and if the resin is allowed to build up on the liner, the liner will become unfit for further use. It has been found that by buffing the liner after each use, the small particles of resin can be easily removed thereby increasing the overall life of the liner. When the liner becomes worn it can be removed from the jaws of the mold and a new liner substituted at a minimum of time and cost.

Buffing of the liner doesn't increase the production time since it is done right on the assembly line. Recently cast liners have become available in limited quantities which may eliminate buffing if the surface of the liner turns out to be perfect. Teflon because of its non-wetting characteristics eliminates the use of release agents required in cast molds to free the coil. The Teflon liner also eliminates the buckling and sealing problems encountered in the molds set forth in copending application Serial Number 830,103, filed July 28, 1959.

The primary object of this invention is to provide a mold which will lend itself to multiple casting.

Another object is to provide a mold which can be opened sufficiently to permit easy loading and unloading of the coil and which will close on the coil to effect a tight seal, preventing leakage around the ends of the bobbin.

A further object of the invention is to provide a mold which can easily be changed to accommodate various sizes of coil.

Figure 2:
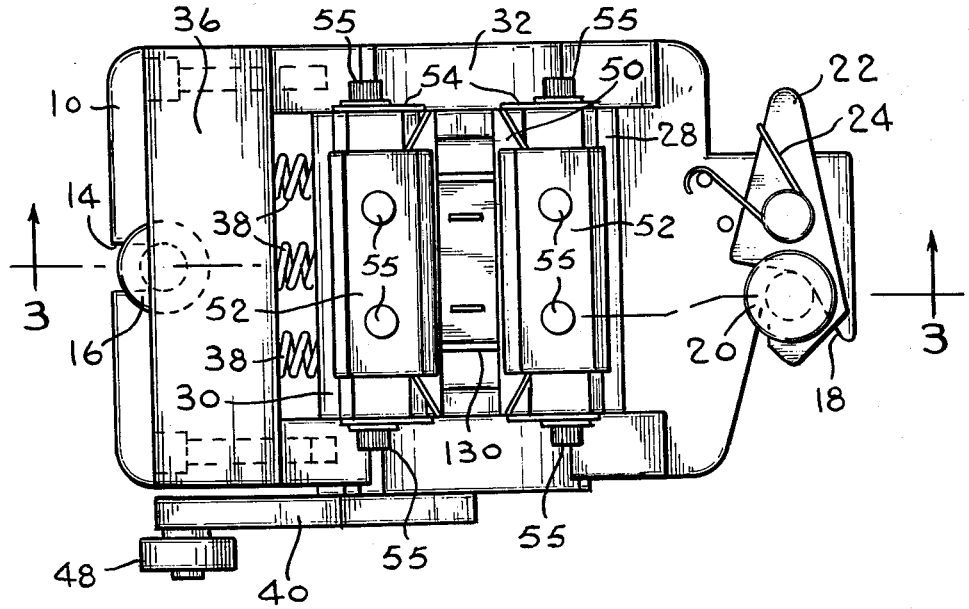
Figure 3:
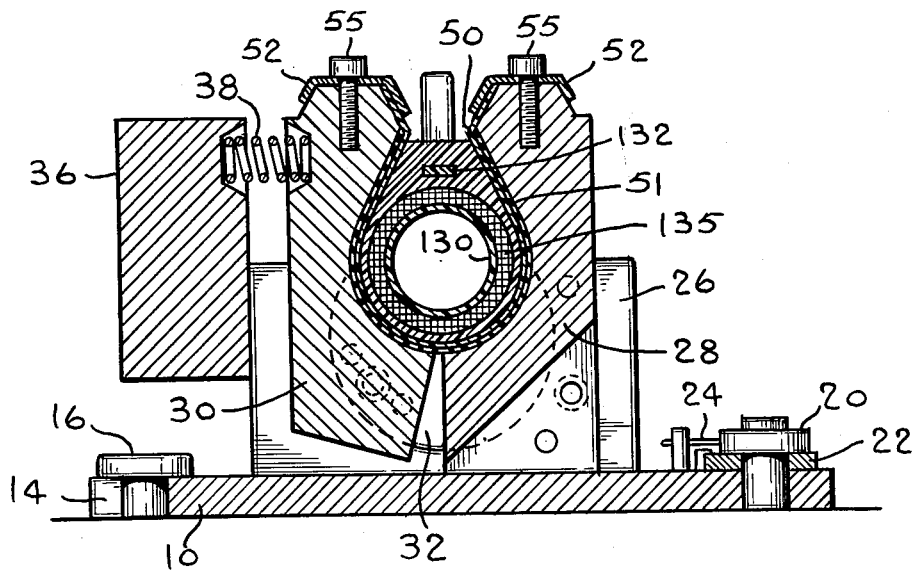
Figure 4:
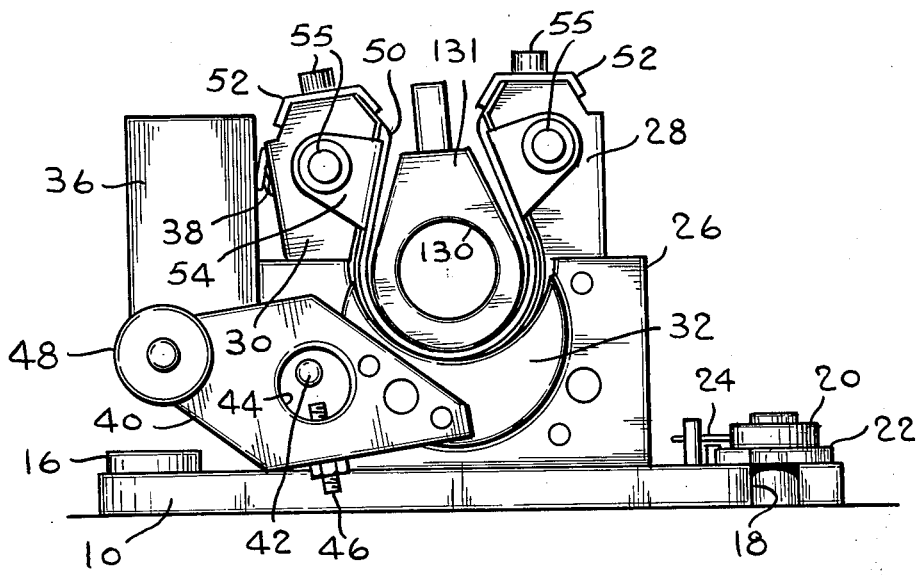
Figure 11:
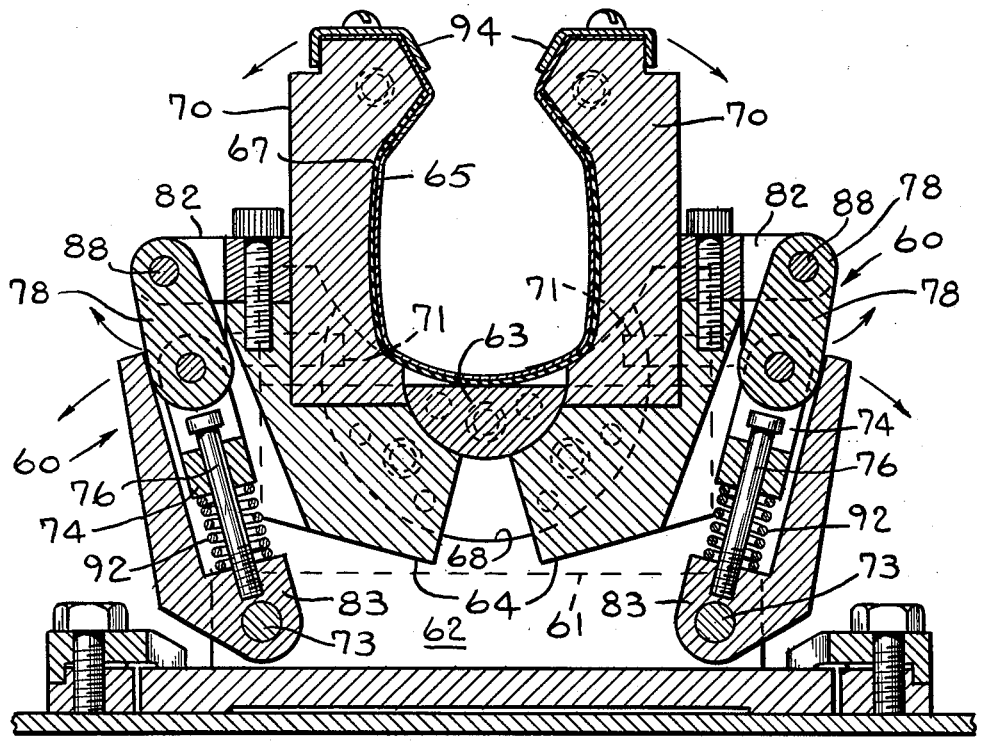
Figure 5:
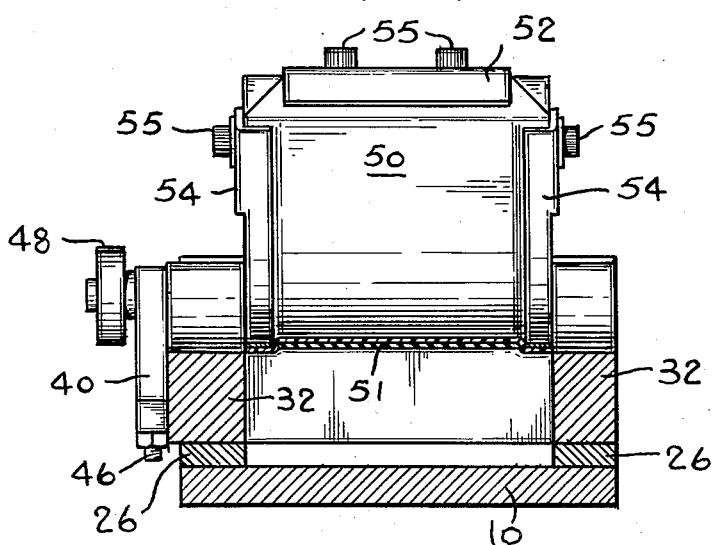
Figure 8:
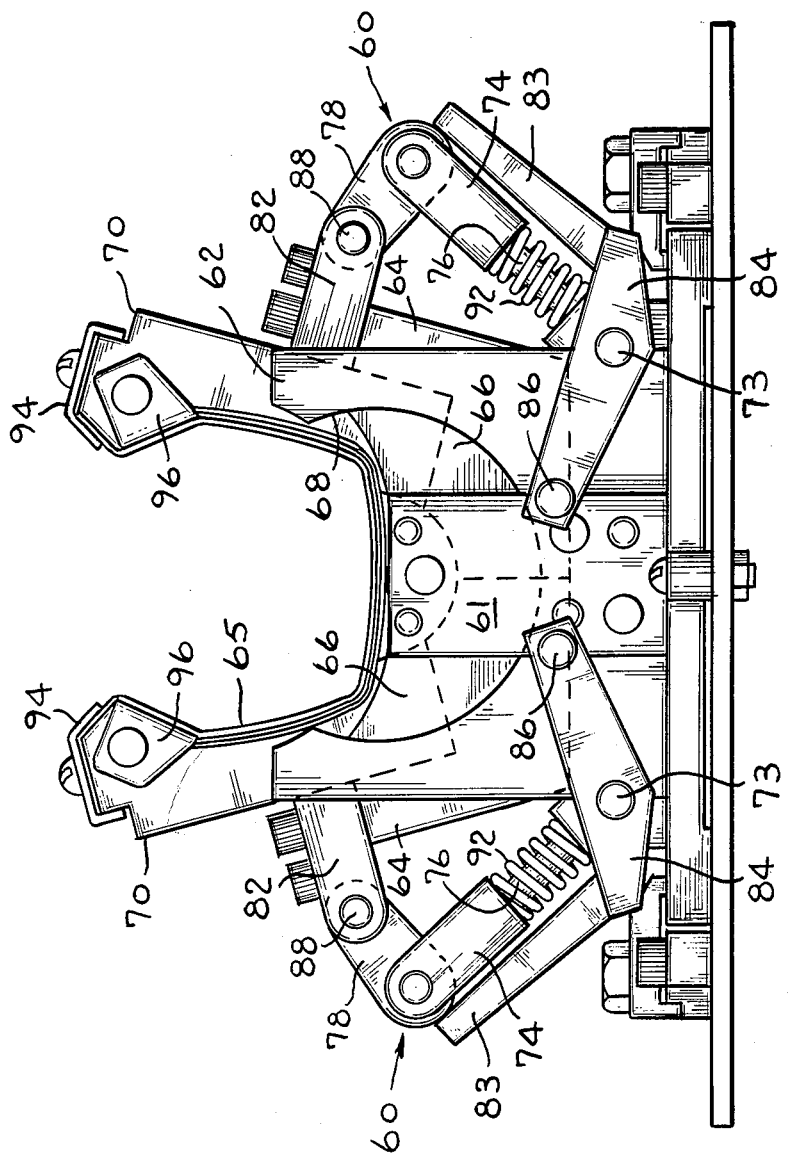
Figure 10:
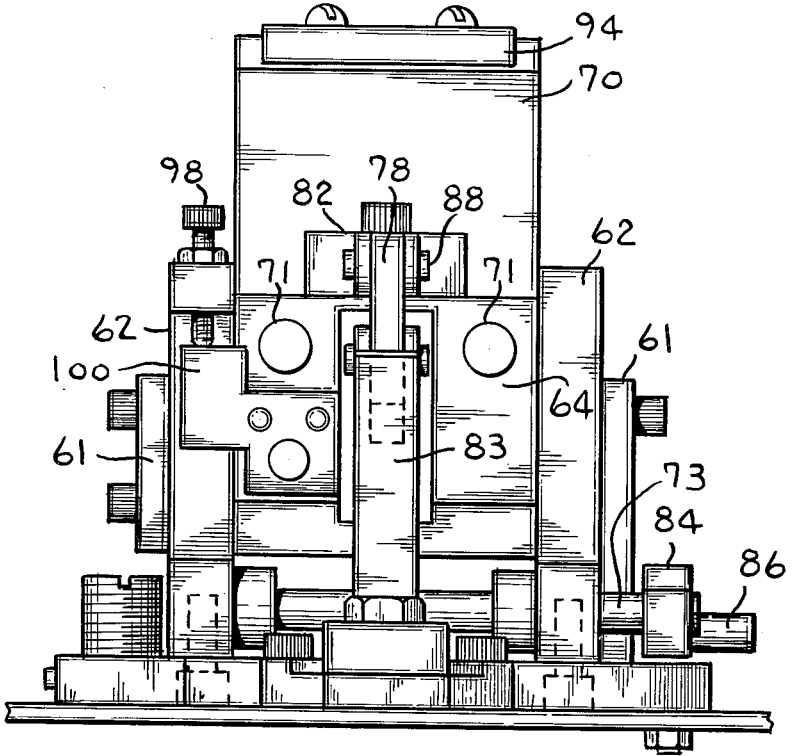
Figure 13:
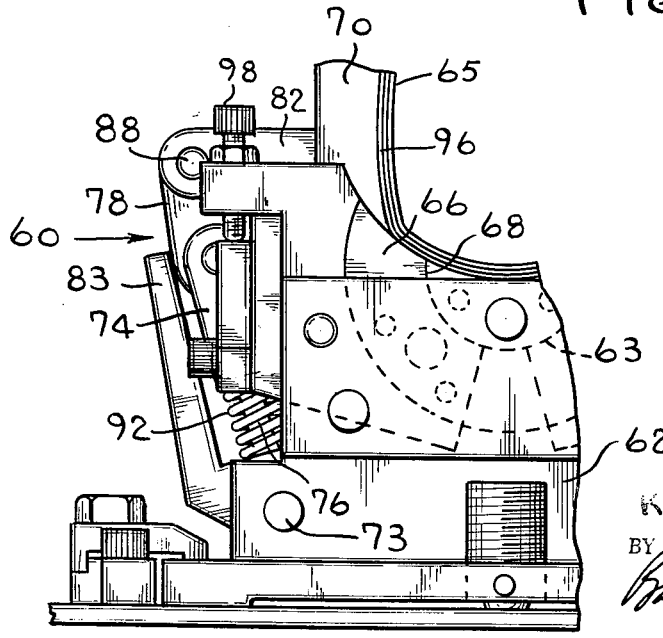
Figure 12:
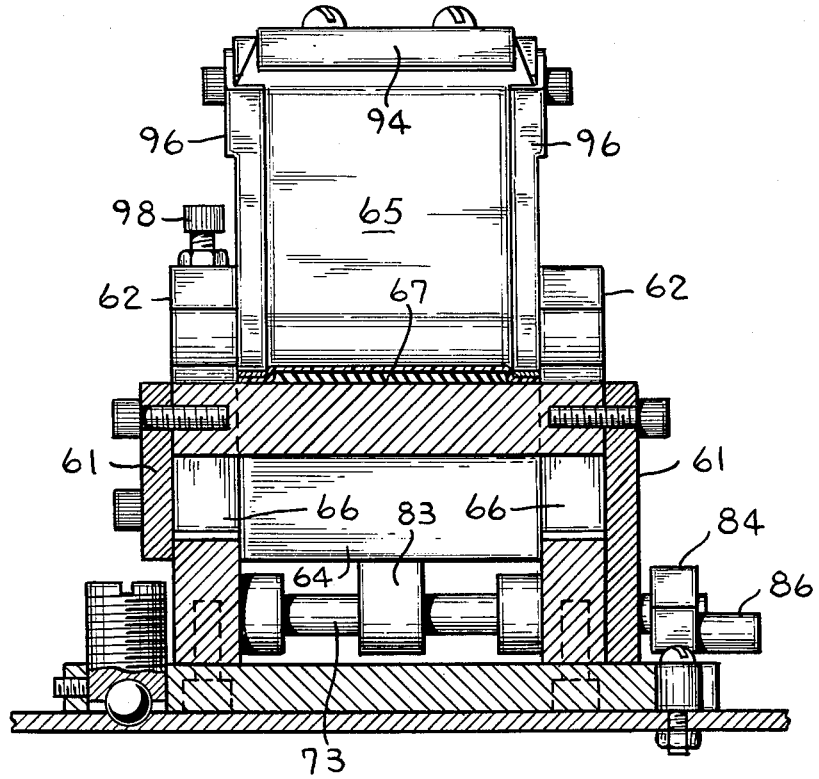
Figure 14:
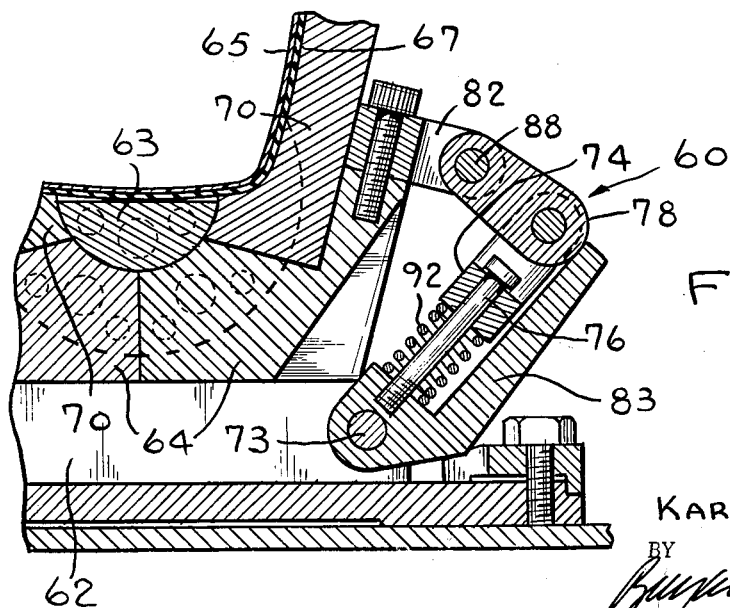
Figure 15:
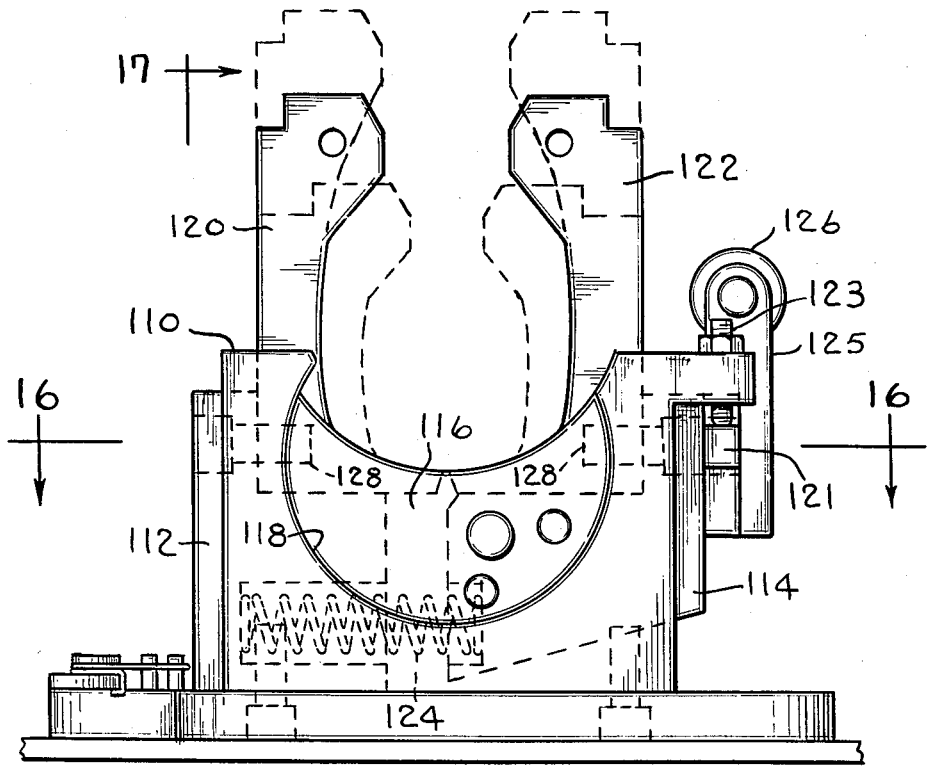
Figure 16:
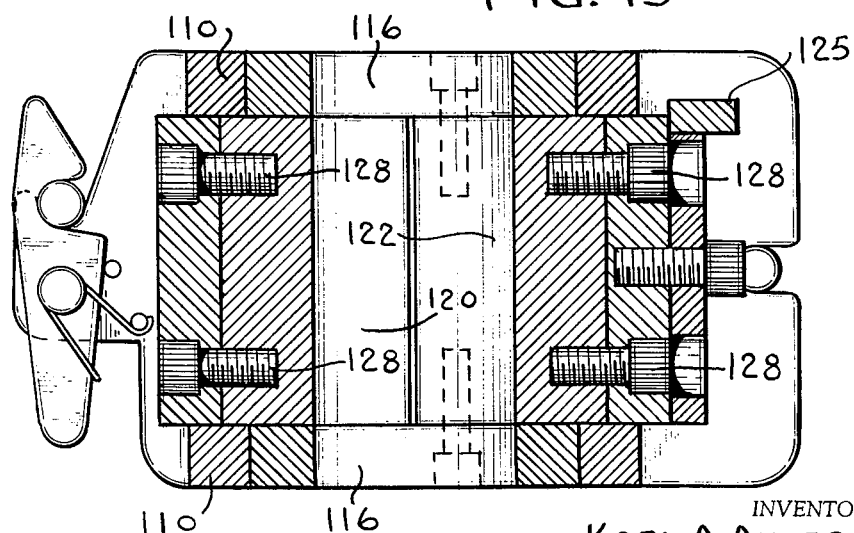
Figure 17:
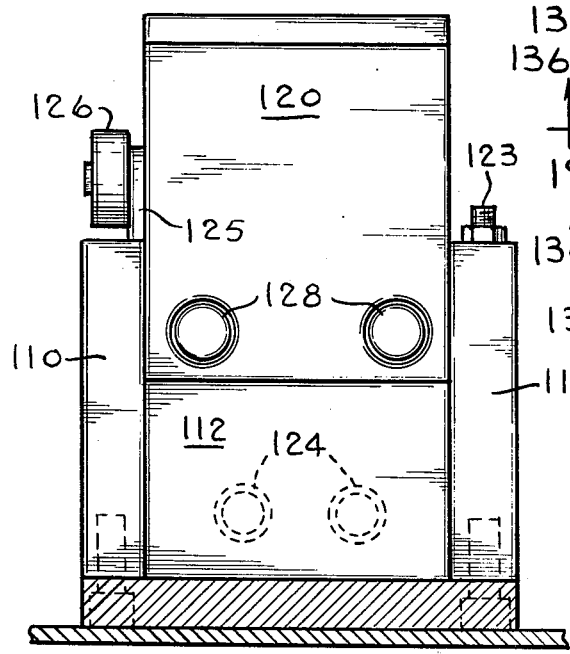
Figure 18:
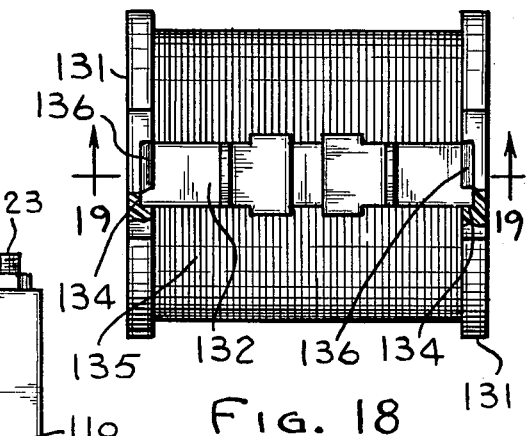
Figure 21:
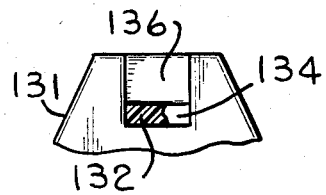
Figure 19:
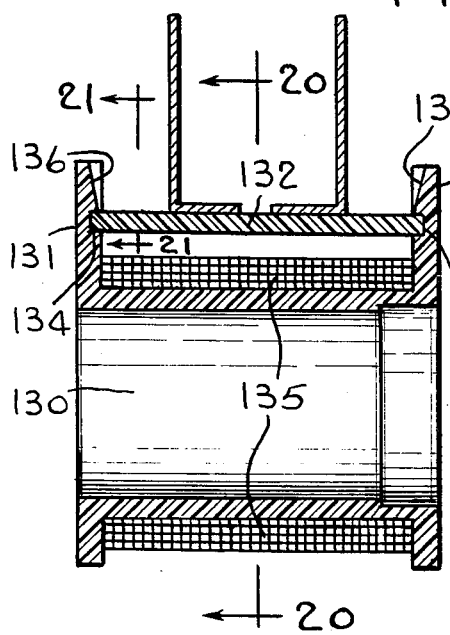
Figure 20:
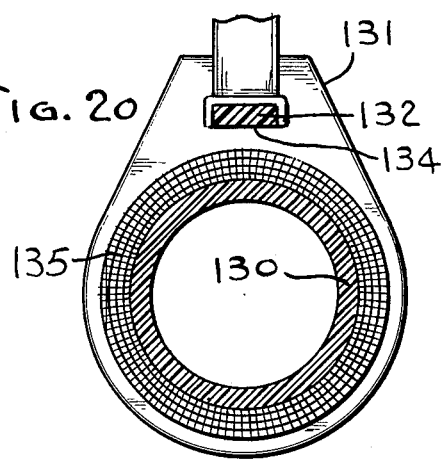
Figure 22:
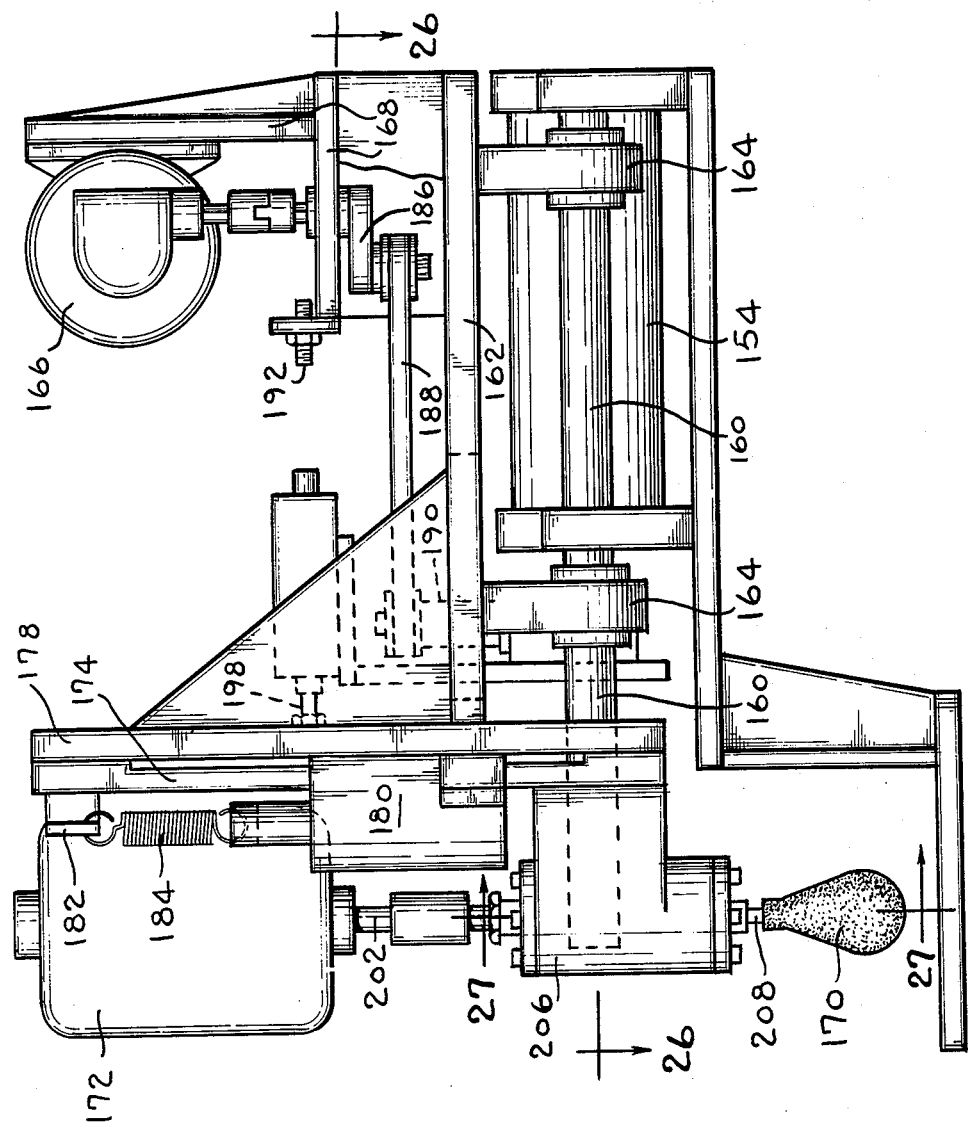
Figure 23:
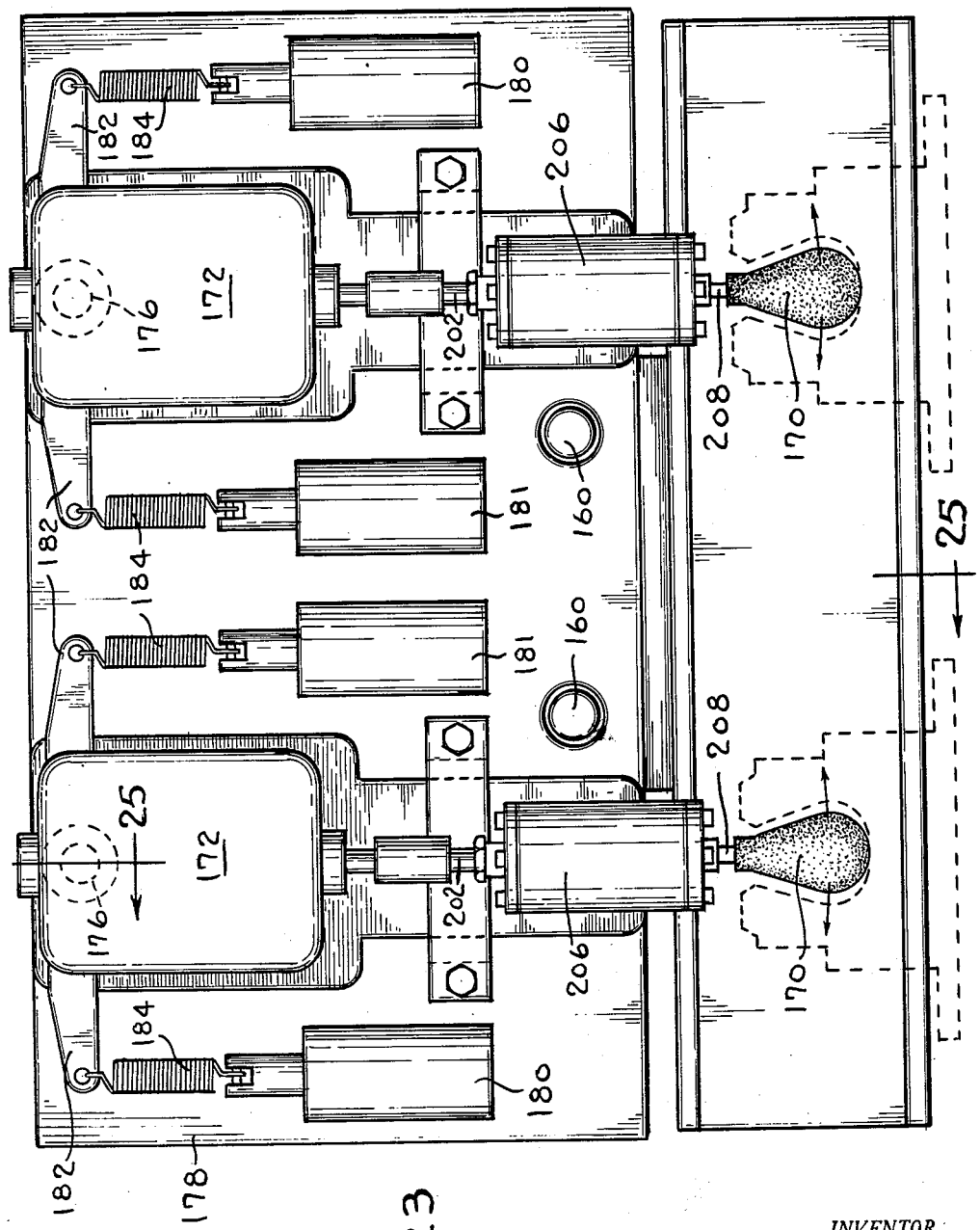
Figure 24:
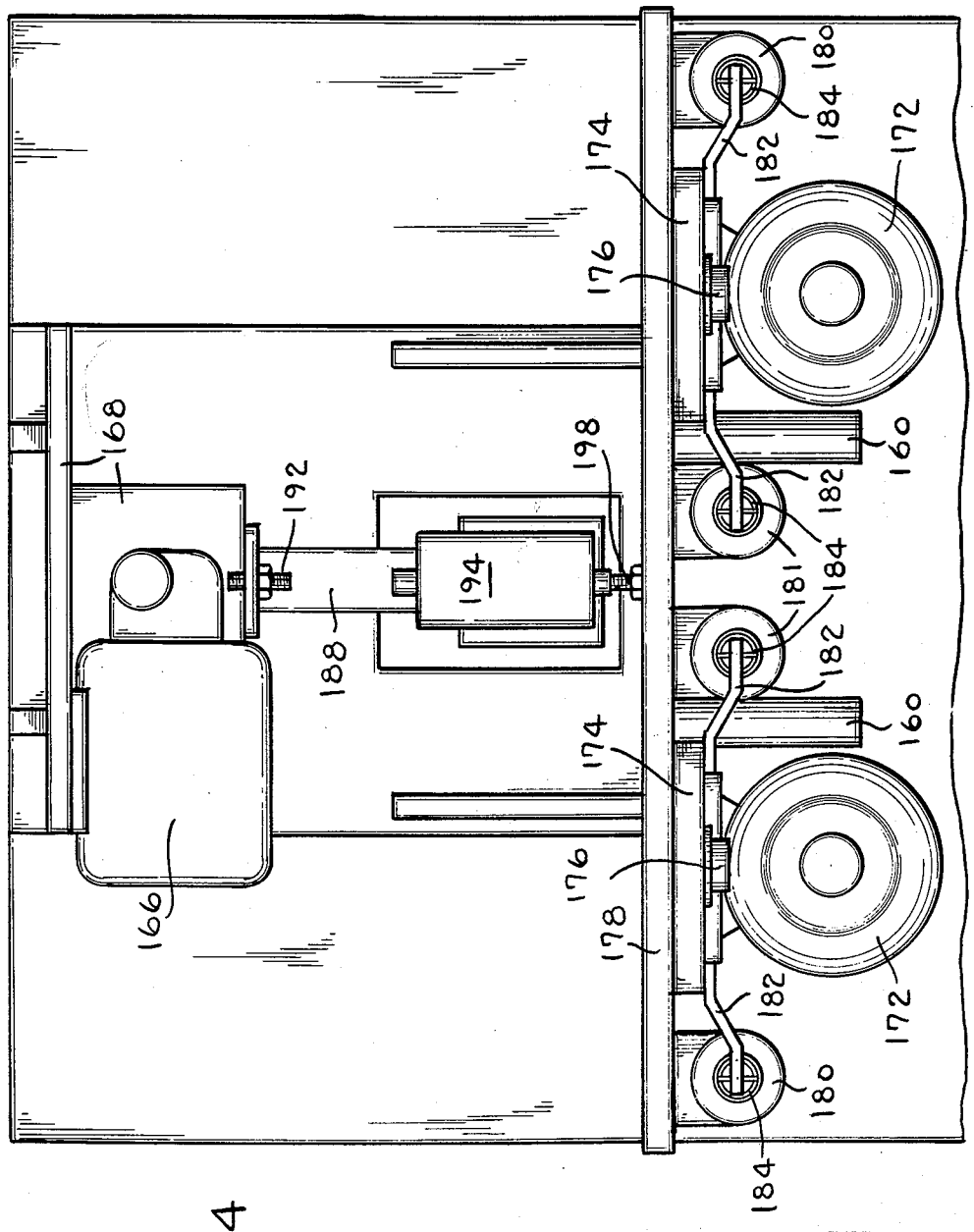

Other objects and advantages will be pointed out in or be apparent from the specification and claims as will obvious modifications of the embodiments shown in the drawing in which:

FIGURE 1 is a side elevation of a flexible mold.
FIGURE 2 is a top plan view of the flexible mold.
FIGURE 3 is a cross section taken on line 3—3 of FIGURE 2 showing the coil in the mold.
FIGURE 4 is a side elevation showing the mold open.
FIGURE 5 is taken on line 5—5 of FIGURE 1 showing the interior of the mold.
FIGURE 6 is taken on line 6—6 of FIGURE 1 showing a coil in the mold.
FIGURE 7 is a side elevation of a modified type of mold using a toggle arrangement.
FIGURE 8 is a side elevation of the toggle mold in an open position.
FIGURE 9 is a top plan view of the toggle mold.
FIGURE 10 is an end view of the toggle mold in the closed position.
FIGURE 11 is taken on line 11—11 of FIGURE 9 showing a cross-section of the toggle mold.
FIGURE 12 is taken on line 12—12 of FIGURE 7 showing the interior of the toggle type mold.
FIGURE 13 is a fragmentary back view of FIGURE 7.
FIGURE 14 is a fragmentary sectional view of FIGURE 8.
FIGURE 15 is another type mold adaptable for a variety of coil sizes.
FIGURE 16 is taken on line 16—16 of FIGURE 15.
FIGURE 17 is taken on line 17—17 of FIGURE 15 showing an end view of the changeable mold.
FIGURE 18 is a top view of the coil encapsulated in the present molds.
FIGURE 19 is taken on line 19—19 of FIGURE 18 showing a sectional view of the coil.
FIGURE 20 is taken on line 20—20 of FIGURE 19 showing a cross-section of the coil.
FIGURE 21 is taken on line 21—21 of FIGURE 19 showing the bridge connection for the coil.
FIGURE 22 is a side elevation of the buffer used in the process for cleaning the molds.
FIGURE 23 is a front elevation of the buffers used in the present molds.
FIGURE 24 is a top elevation of the buffer.
FIGURE 25 is taken on line 25—25 of FIGURE 23 showing a sectional view of the buffer.
FIGURE 26 is taken on line 26—26 showing a fragmentary sectional view of the drive system for the buffer.
FIGURE 27 is taken on line 27—27 of FIGURE 22 showing the biasing means for the buffer.

In the mold shown in FIGURES 1 through 6, a pair of mounting brackets 26 are secured to the base 10 and support fixed jaw 28. A second jaw 30 is rotatably supported by arcuate end members 32 slideably positioned in semicircular apertures 34 in the mounting bracket. Jaw 30 is biased toward jaw 28 by a number of compressed springs 38 supported by block 36 which is secured to the mounting brackets. Teflon liner 50 is positioned within the jaws on silicone rubber backing 51 and secured to the top of each jaw by a clamp 52. Flexible end rings 54 hold the sides of the liner against the jaws so that the liner will follow the opening and closing movements of the jaws. Jaw 30 is moved away from jaw 28 against the bias of springs 38 by the downward movement of cam arm 40 which is secured to one of the arcuate members 32. This motion is accomplished by passing the mold past a stationary cam actuator so that cam follower 48 mounted on cam arm 40 engages with and is forced downward by the actuator. The cam arm is provided with aperture 44 which engages pin 42 located on the mounting bracket to limit the closing motion of jaw 30 upon disengagement from the actuator. An adjusting screw 46 is provided in the cam arm to vary this closing motion.

If the liner has to be replaced because it has been damaged or has become worn, the molds can be removed from the assembly line and serviced rather than shutting down the assembly line and repairing during a run. The liner is removed from the mold by releasing screws 55 from clamps 52 and end rings 54. The jaws are designed for a particular type coil and the heat resistant silicone rubber backing increases the sealing effect of the liner on the coil. It should be noted that in this particular model, a cam actuator is required along the conveyor to hold the mold open.

In FIGURES 7 through 14, however, the mold is opened and closed by tripping toggle system 60. The mold includes a pair of mounting brackets 62 secured to the base and provided with semicircular openings 68. A pair of jaw holders 64 are secured to arcuate end members 66 which are slideably positioned in openings 68. The jaw holders and arcuate end members are guided and held in position by semicircular bar 63 secured to the mounting brackets by side plates 61. A jaw 70 is secured to each jaw holder by bolts 71 so that the jaws can be changed for various size coils. Teflon liner 65 is positioned within the jaws on silicone rubber backing 67 and is secured to the tops of the jaws by clamps 94. Flexible end clamps 96 hold the sides of the liner against the jaws so that the liner will follow the opening and closing movements of the jaws. The space between the jaws can be varied by adjusting screws 98 which act on brackets 100 to move the jaws up or down.

Toggle system 60 has link 78 pivotally connected by pin 88 to bifurcated member 82 mounted on the jaw holder and another link 74 slideably mounted on pin 76 and biased outward by spring 92. Pins 76 are mounted in arms 83 which are rigidly secured to rods 73 so that the axis of pin 76 can be rotated past a line drawn from the axis of pin 88 to the axis of rod 73. By applying a downward force to pin 86 on crank arm 84 which is rigidly attached to the end of rod 73, pin 76 will be rotated upward causing link 78 to rotate downward against the bias of spring 92. When the axis of pin 76 has moved over center the jaws will be held closely by the bias of spring 92 acting upward through link 78 against member 82. To open the mold the pins 86 on crank arms 84 are moved upward rotating pin 76 back over center so that the bias of spring 92 on member 82 is reversed pulling the jaws open.

This mold can also be removed from the line while in operation for repair. Using a toggle system to open and close the mold eliminates the necessity of providing a positive means for holding the mold open on the assembly line thereby simplifying the loading and unloading operations. This mold also increases the versatility of the apparatus since the jaws can be readily replaced for different sizes and shapes of coils while retaining the basic (and expensive) base portion.

In FIGURES 15, 16 and 17 there is shown another modification of a flexible mold in which a pair of mounting brackets 110 are secured to the base and support stationary jaw holder 112. Rotatable jaw holder 114 is mounted on arcuate end members 116 which are slideable in semi-circular apertures 118 provided in the mounting brackets. Jaws 120 and 122 are secured to the jaw holders by screws 128 and have a Teflon liner positioned therein on a rubber backing and secured thereto by clamps as previously described. Jaw holder 114 is biased by a plurality of compressed springs 124 mounted in jaw holder 112 so that jaw 122 is biased toward jaw 120. Cam follower 126 is secured to jaw holder 114 by bracket 125 and on engaging a stationary cam actuator will rotate jaw 122 away from jaw 120 to open the mold. The closing movement of jaw holder 114 is limited by bar 121 engaging adjusting screw 123.

This mold has been modified to present a more compact structure by mounting the springs in the base of the pin holders. The jaws are interchangeable for various size and shape coils as shown in FIGURE 15. The jaws can be removed from the jaw holders by merely removing screws 128. A cam actuator must be provided along the conveyor to hold the mold open while loading and unloading.

The coil (FIGURES 18–21) used in these molds has a one piece plastic bobbin 130 with end flanges 131 integral therewith. The flanges are shaped to conform to the shape of the interior surface of the jaws so that when the jaws are closed on the coil the outer edge of the flange will be sealed against the liner. The tightness of this seal can be varied by the adjusting screws provided on each of the molds previously described. A cavity mold will then be defined between the coil flanges and the interior surface of the jaws. The top portion of the flanges are provided with notches 134 and cam surfaces 136. The core of the bobbin is wound with wire 135 and the bridge 132 inserted therein by positioning one end of the bridge in one of the notches and sliding the other end of the bridge down the cam surface provided on the opposite end member into the other notch. The bridge is relatively narrow so that the encapsulant when poured into the mold will have sufficient room on either side of the bridge to flow freely to the bottom of the cavity mold. All three of the above described molds can be easily attached to a conveyor type system and opened by cam actuators placed next to the conveyor. While the mold is opened a coil is inserted between the jaws and when the mold closes the ends of the coil will seat on the Teflon liner forming a seal therewith, the tightness of the seal depending on the setting of the adjusting screws provided on each mold. A metered quantity of resin encapsulant is then poured or injected into the mold, sufficient space being provided between the bridge of the coil and the liner to allow the encapsulant to flow past the bridge to fill around the coil. The encapsulant is allowed to set and the mold is then opened to remove the coil.

At the present time, no Teflon of suitable thickness has been found having a surface of such perfection that minute quantities of resin will not mechanically adhere thereto. If the resin is allowed to remain on the liner during successive casts it will build up to such an extent that the liner will not separate properly from the encapsulated coil. It has been found that if the liner is burnished or buffed between uses, any small particles tending to mechanically adhere to the liner will be knocked out and the life of the liner will be greatly extended. Experience to date has indicated that better than a ten fold increase in the life of the liner can be expected by buffing the liner and this makes at least a continuous run for one work shift feasible before shut down for servicing.

The buffing is accomplished by pear shaped, felt buffers 170, rotated at high speed (5,000 r.p.m.) using a dressing compound. This is necessary to "close the pores" and to dislodge or remove any resin particles remaining when the coil is ejected. The buffer assembly is adapted to be moved to an operative position by pressurizing air cylinder 154 so that piston 156 and its rod 158 slide the assembly outward on guide rods 160. The buffer assembly includes horizontal plate 162 slideably supported on guide rods 160 by apertured bosses 164 and supporting oscillator motor 166 on bracket 168. The buffers 170 and buffer drive motors 172 are rigidly secured to mounting plates 174 which are mounted on pins 176 in vertical plate 178 so that the buffer can be rocked back and forth about pins 176 by the action of solenoids 180 and 181 connected to levers 182 by spring 184.

The buffers are moved to the operative position with the solenoids 180, 181 de-energized so that the buffers enter the molds in a neutral position. The buffers are driven through drive assembly 200 which has drive shaft 202 rotatably supported in bearing races 204 in housing 206. The buffer is mounted on rod 208 which fits within aperture 210 in the drive shaft and is biased downward by spring 212. Pin 214 is inserted in transverse slot 216 in the drive shaft so that the buffer on engaging the bottom of the mold will be moved upward slightly against the bias of the spring assuring that the buffer will contact the bottom of the mold.

The buffer is moved through the mold by the rotative motion of crank 186 driven by motor 166 acting on bar 188 connected to pivot post 190. During the first half revolution of crank 186 the buffer will be advanced through the mold due to the pulling action of crank 186 on bar 188. In the second half revolution the buffer will be returned through the mold due to the pushing action of crank 186 on bar 188. As the buffer assembly starts to move through the mold switch actuator 198 will disengage from trip switch 194 energizing solenoids 180 rocking the mounting plates on pins 176 so that the buffers are biased outward against the liners by springs 184. At the end of the advancing or forward motion of the buffers switch actuator 192 on bracket 168 engages trip switch 194 de-energizing solenoids 180 and energizing solenoids 181 so that on the return motion of the buffers they will be biased towards each other to buff the opposite wall of the liner. The solenoids are energized in this manner so that the forces introduced into the buffer assembly by the buffers acting on the liners will be opposed to each other thereby eliminating the possibility of any binding occurring on the guide rods.

The buffers are moved back and forth through the molds a number of times during each step in the movement of the conveyor, while the other molds are being loaded, cast and unloaded. The time required for a step in the movement of the conveyor is determined by the time required to cast the coil. The resin and hardener are poured at a rate sufficient to allow them time to flow completely into the mold without overflowing. To speed up the production rate two molds are loaded, cast, unloaded and burnished at each step of movement. This dual operation requires the twin buffer assembly to clean the pair of liners simultaneously.

This type of mold is readily adaptable to the use of an expendable liner which can be supported and sealed against the coil by any one of the disclosed molds. In such a system it is contemplated that the liner becomes a part of the coil.

A distinctive advantage of the molds shown in FIGURES 7 and 15 is the adaptability of the molds to a variety of sizes and shapes of jaws. The liners are of a flexible material which readily assumes the shape of the jaw without introducing any distortions in the finished coil. The mold is therefore capable of encapsulating any product which has end sections that can be sealed to the liner and forming a cavity mold therebetween.

Although but one embodiment of the present invention has been illustrated and described, it will be apparent to those skilled in the art that various changes and modifications may be made therein without departing from the spirit of the invention or from the scope of the appended claims.

We claim:
1. A molding apparatus for encapsulating a coil in an epoxy resin comprising a coil including wire wound on a bobbin having flanged ends projecting beyond the surface of the wire winding and serving as end closures for a mold, a mold contoured to embrace said bobbin and including mold surfaces adapted to surround the peripheries of said flanged ends when the mold is closed around the bobbin, a flexible mold liner member, means for supporting the flexible liner member in position to cover the inner surfaces of the mold including those portions of the mold surfaces which are contoured to surround the peripheries of said bobbin flanges, and means for closing the mold around the coil to seat the flexible liner firmly against the peripheries of said flanges to define and seal, in cooperation with said flanges, a closed mold cavity for the reception of the encapsulating material.

2. The apparatus described in claim 1 wherein the mold comprises a pair of complementary movable jaws and means for biasing said jaws into bobbin engaging position.

3. A molding apparatus for encapsulating an article in an epoxy resin material comprising an article having spaced outwardly projecting end portions and an intermediate surface between said end portions which surface is to be encapsulated, said end portions of the article serving as end closures for an encapsulating mold, a mold having relatively movable jaw members contoured to embrace said article and including inner mold surfaces complementary to the peripheries of said projecting end portions, a flexible liner, means for supporting said flexible liner so that it substantially fully covers the interior surface of said jaws, including said complementary inner surfaces, means biasing the jaws and the liner against the peripheries of said end portions with an intermediate part of the liner between the projecting end portions spaced from said intermediate surface of said article to provide a mold cavity, closed by the projecting end portions of said article, for receiving encapsulating epoxy resin material.

4. The apparatus described in claim 3 wherein said article is a coil of wire wound on a bobbin having end flanges projecting outwardly beyond the surface of the wire winding, and wherein said flexible liner is replaceable and made of material to which the encapsulating material does not readily adhere.

References Cited in the file of this patent

UNITED STATES PATENTS

| | | |
|---|---|---|
| 149,789 | Reagan | Apr. 14, 1874 |
| 271,496 | McClelland | Jan. 30, 1883 |
| 459,359 | Ellery | Sept. 8, 1891 |
| 977,687 | Todt | Dec. 6, 1910 |
| 1,126,853 | Peterson | Feb. 2, 1915 |
| 1,906,566 | Friedl | May 2, 1933 |
| 1,924,340 | Whitehouse | Aug. 29, 1933 |
| 2,082,746 | Hyning | June 1, 1937 |
| 2,347,972 | Scott et al. | May 2, 1944 |
| 2,406,005 | Doherty | Aug. 20, 1946 |
| 2,450,157 | Peckett | Sept. 28, 1948 |
| 2,511,436 | Kauth | June 13, 1950 |
| 2,541,544 | Rahaim | Feb. 13, 1951 |
| 2,611,930 | Hill et al. | Sept. 30, 1952 |
| 2,668,987 | Harris et al. | Feb. 16, 1954 |
| 2,724,862 | Merrill et al. | Nov. 29, 1955 |
| 2,787,089 | Hawkinson | Apr. 2, 1957 |
| 2,835,016 | Dixon | May 20, 1958 |
| 2,882,504 | Hultgren | Apr. 14, 1959 |
| 2,934,807 | Donati | May 3, 1960 |
| 2,941,570 | Plym | June 21, 1960 |

FOREIGN PATENTS

| | | |
|---|---|---|
| 802,713 | Great Britain | Oct. 8, 1958 |